P. Schemmals
Hose Coupling
N° 44,487.　　　　　　　　　　　Patented Sep. 27, 1864.
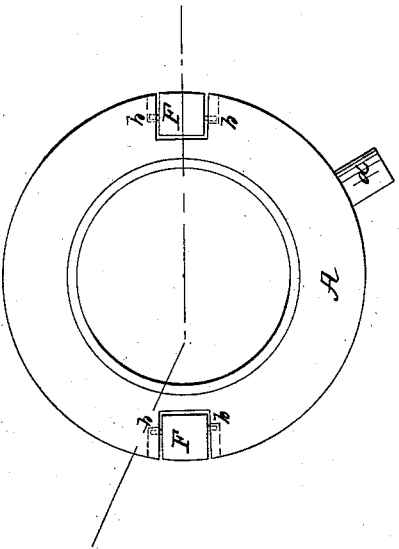
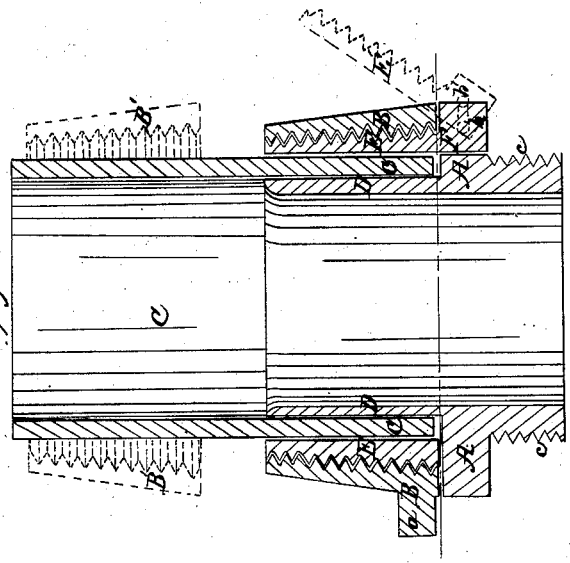
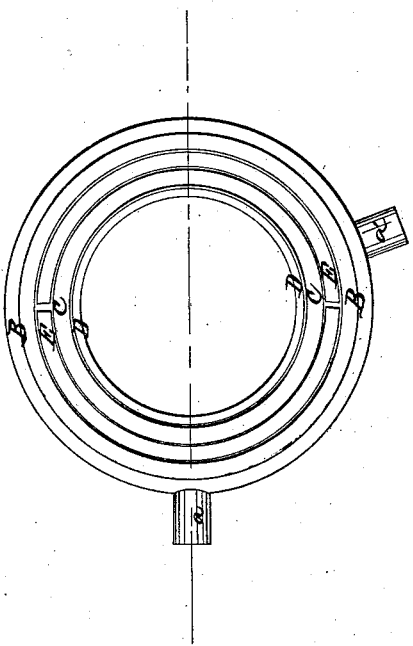
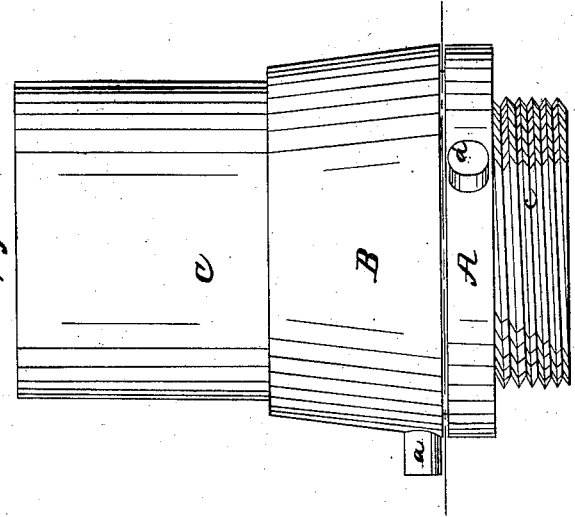
Witnesses
W. H. Mendell
L. L. Bird
Inventor.
Peter Schemmals

UNITED STATES PATENT OFFICE.

PETER SCHEMMALS, OF CHICAGO, ILLINOIS, ASSIGNOR TO URIAH P. HARRIS, OF SAME PLACE.

IMPROVED HOSE-CONNECTION.

Specification forming part of Letters Patent No. 44,487, dated September 22, 1864.

*To all whom it may concern:*

Be it known that I, PETER SCHEMMALS, of the city of Chicago, in the county of Cook and State of Illinois, have invented certain new and useful Improvements in Hose-Connections; and I do hereby declare that the following is a full, clear, and exact description of the same, reference being had to the accompanying drawings, making a part of this specification, in which—

Figure 1 is an outside view with the hose attached; Fig. 2, a top view with the connection screwed down; Fig. 3, a vertical section with hose attached, and Fig. 4 a transverse section.

Like letters refer to similar parts in all the figures.

The nature and object of my invention consist in providing an ordinary coupling, whether made by screw-clasps, springs, or otherwise, with a new device for connecting or fastening the hose to the coupling or butt, by adding thereto a sectional band, made conical in shape, with a screw cut in its periphery the entire width of the band, or nearly so, and hinged at its broadest end, in combining it with a funnel-shaped band or nut to form a clamp, and in combining such clamp with the hose and inner projection or elongation of the butt or coupling.

To enable others skilled in the art to make and use my invention, I will proceed to describe its construction and operation.

I make the entire butt or coupling of brass or other suitable material, the length and diameter being in a measure determined by the size of the hose. For the ordinary hose used with fire-engines each half of the coupling is made about three inches in length and about two and one half inches in diameter.

The lower and inner portion, A and D, are made in the ordinary manner so far as the inner surface is concerned, and the screw $c$ attached in the usual method for a screw-coupling, the male portion only being shown; but the kind of coupling is not material. The outer surface of D is made rough, so as to secure the hose without injury to its texture. The disk or rim A is carried out so as to form an even surface with the circumference of the band B, and is of sufficient thickness to hold the slide or hinge or sliding hinge F. Into this rim A, I hinge two or more sections, E, which together constitute an entire band. These sections are made conical or converging toward the top, the coupling being supposed to stand on its end in the drawings. Their inner surface is made rough, the same as D, and their outer surface provided with a screw-thread, as shown at Fig. 3. Each section is hinged at F by extending a projection through the rim A, and to make a hinge, small slots are cut at each side of the holes cut in A, and fitting in these slots are the small pins $b$, so that these sections can be turned out at the top, as shown by the red lines E', or slid outward without turning, or partially slid and then turned, as shown at $b'$, Fig. 3. I have shown but two sections, and this number will be found best in operating the fastening, although a greater number may be used, and they can also be used without cutting the screw-thread down the entire distance, but I think not so advantageously. Outside of this sectional conical band E, I attach another band, B, which is made funnel shape, and on its inner surface a screw-thread is cut to correspond with the thread on the outer surface of E. On the outer surface of this band B are placed lugs or small bolts, $a'$, so that it can be operated with an ordinary spanner, and they, $a'$, are also attached for the same purpose to the rim A. In order to operate this fastening or connection of the butt or coupling with the hose, the funnel-shaped band B is put on the hose C, as shown at B', Fig. 3. The sectional band E is opened either by sliding or turning the tops of the sections outward. The hose is then inserted between E and D, when B is screwed on to E, making a strong clamp and holding the hose securely in place without injury to it. It is apparent that this makes a powerful clamp, and one which can readily be operated, so that at fires, when the hose bursts, as it usually does near the butt, the injured part can be cut away and the balance attached in so short space of time as to obviate the necessity of removing the entire length of hose.

Having thus fully described my improvements, what I claim as my invention, and desire to secure by Letters Patent, is—

1. The band E, made in two or more sections, provided with a screw-thread on its outer surface and hinged, substantially as specified.

2. The combination of the sectional conical band E and the funnel-shaped band B, the two forming a clamp.

3. The bands B and E, in combination with the hose C and the inner band or projection, D, all being constructed and operating substantially as set forth and specified.

PETER SCHEMMALS.

Witnesses:
L. L. BOND,
W. H. MENDELL.